United States Patent
Heinrich et al.

(10) Patent No.: US 9,128,283 B1
(45) Date of Patent: Sep. 8, 2015

(54) DYNAMICALLY ADJUSTABLE FRAME

(75) Inventors: Mitchell Joseph Heinrich, San Francisco, CA (US); Eliot Kim, Cupertino, CA (US)

(73) Assignee: Google Inc., Mountain View, CA (US)

( * ) Notice: Subject to any disclaimer, the term of this patent is extended or adjusted under 35 U.S.C. 154(b) by 653 days.

(21) Appl. No.: 13/474,345

(22) Filed: May 17, 2012

(51) Int. Cl.
  *G08B 21/00* (2006.01)
  *G02B 27/01* (2006.01)

(52) U.S. Cl.
  CPC .................................. *G02B 27/017* (2013.01)

(58) Field of Classification Search
  CPC ...... G02C 11/00; G02C 11/10; G02B 27/017; G02B 2027/0138; G02B 2027/0187; G02B 2027/014; G06F 3/013
  USPC ........... 340/686.1, 669, 506, 573.1, 521–523, 340/539.1, 540, 575, 576, 668, 573.7; 351/158, 41, 116, 123, 49; 359/618, 359/630, 237, 465; 361/679.03; 345/7, 8
  See application file for complete search history.

(56) References Cited

U.S. PATENT DOCUMENTS

| | | | |
|---|---|---|---|
| 7,231,723 B1 * | 6/2007 | O'Neill et al. | 33/512 |
| 8,134,593 B2 | 3/2012 | Otsuki et al. | |
| 2003/0038919 A1 * | 2/2003 | Lin | 351/57 |
| 2008/0278678 A1 * | 11/2008 | Howell et al. | 351/158 |
| 2009/0265958 A1 | 10/2009 | DiBenedetto et al. | |
| 2010/0110368 A1 * | 5/2010 | Chaum | 351/158 |
| 2010/0238395 A1 * | 9/2010 | Laustsen et al. | 351/117 |
| 2012/0062445 A1 | 3/2012 | Haddick et al. | |
| 2013/0265169 A1 * | 10/2013 | Mates | 340/686.1 |

* cited by examiner

*Primary Examiner* — Anh V La
(74) *Attorney, Agent, or Firm* — McDonnell Boehnen Hulbert & Berghoff LLP

(57) ABSTRACT

The present disclosure describes example systems and methods for dynamically adjusting a tension of at least a portion of a frame of wearable computing device. The systems and methods may be directed to receiving an input signal from a component of the wearable computing device that is indicative of a movement of the wearable computing device. An adjustment of the tension of at least the portion of the frame may be based on the movement. An output signal that is indicative of the adjustment may be provided to the wearable computing device.

20 Claims, 9 Drawing Sheets

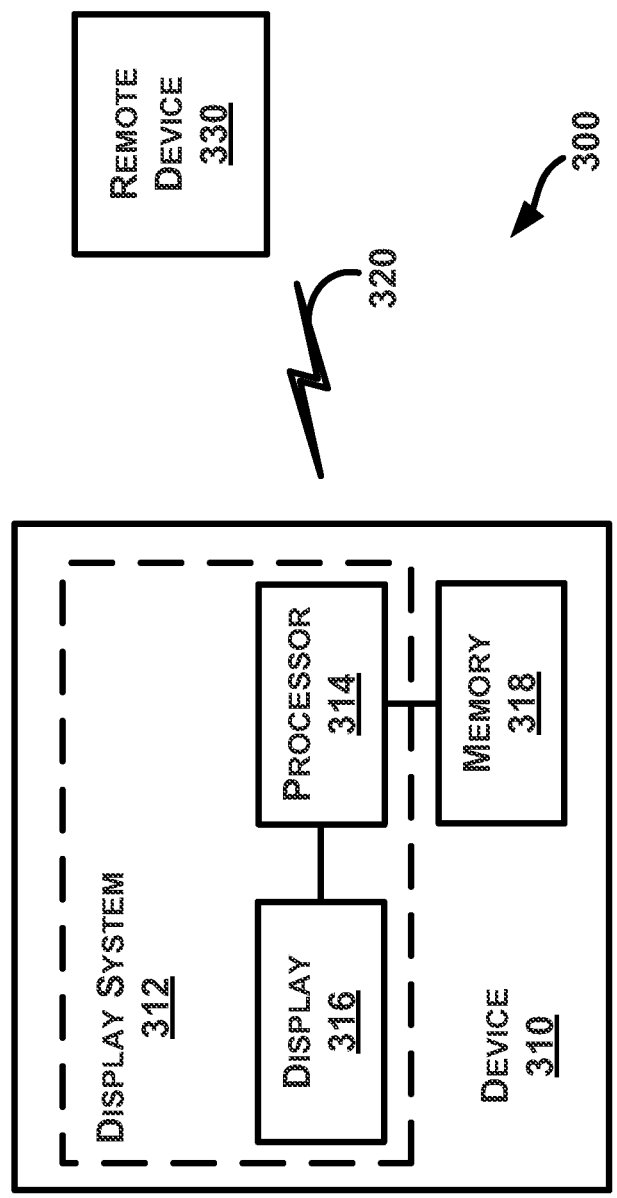

DYNAMICALLY ADJUSTABLE FRAME

BACKGROUND

Applying an electric or magnetic field to some materials may cause the materials to flex or contract. In one example, a structure containing a piezoelectric material may flex in a presence of an electric field. The amount in which the structure flexes may depend on a magnitude of the electric field applied to the piezoelectric material. When the electric field is removed, the structure may become flexible or return to the structure's original shape.

In another example, a structure containing one of a magnetorheological fluid and a shape memory alloy may contract in a presence of a magnetic field. The amount in which the structure contracts may depend on a magnitude of the magnetic field applied to the one of the magnetorheological fluid and the shape memory alloy. When the magnetic field is removed, the structure may become flexible or return to the structure's original shape.

SUMMARY

A method for adjusting a tension of a frame of a wearable computing device is provided. The method may include receiving an input signal from a component of the wearable computing device that is indicative of a movement of the wearable computing device. The method may also include determining an adjustment of a tension of at least a portion of the frame of the wearable computing device based on the input signal. The method may further include providing an output signal to the wearable computing device that is indicative of the adjustment.

In another example, a non-transitory computer-readable memory having stored thereon instructions executable by a computing device to perform functions is provided. The functions may include receiving an input signal from a component of a wearable computing device that is indicative of a movement of the wearable computing device. The functions may also include determining an adjustment of a tension of at least a portion of a frame of the wearable computing device based on the input signal. The functions may further include providing an output signal to the wearable computing device that is indicative of the adjustment.

In another example, a wearable computing device is provided. The wearable computing device may include a frame, a first component configured to determine a movement of a wearable computing device, a second component configured to modify a tension of at least a portion of the frame, and a processor. The processor may be configured to receive an input signal from the first component that is indicative of the movement of the wearable computing device. The processor may also be configured to determine an adjustment to the tension of at least the portion of the frame based on the input signal. The processor may be further configured to provide an output signal to the second component that is indicative of the adjustment.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3 illustrates a simplified block diagram of an example computer network infrastructure.

DETAILED DESCRIPTION

Figure 1A:
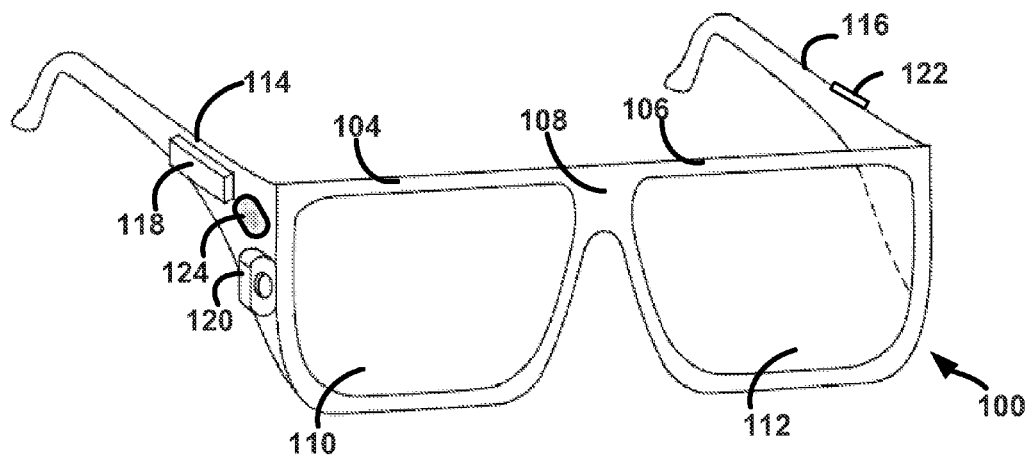
FIG. 1A illustrates an example system for receiving, transmitting, and displaying data.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

Disclosed herein are example methods and systems for dynamically adjusting a tension of a frame of a wearable computing device. An example method may include receiving an input signal from a component of the wearable computing device that is indicative of a movement of the wearable computing device. The method may also include determining an adjustment to a tension of at least a portion of a frame of the wearable computing device. If the wearable computing device is too loose on a user's head, for example, the adjustment may include increasing the tension of at least the portion of the frame. If the wearable computing device is too tight on the user's head, the adjustment may include decreasing the tension of at least the portion of the frame.

The method may further include providing an output signal to the wearable computing device that is indicative of the adjustment. The tension of the portion of the frame may depend on amount of flex of the portion of the frame. In one example, the portion of the frame may contain a piezoelectric material configured to flex in a presence of an electric field. The wearable computing device may adjust a magnitude the electric field applied to the piezoelectric material in response to receiving the output signal. The amount of flex of the portion of the frame may depend on the magnitude of the electric field.

In another example, the frame of the wearable computing device includes a band containing a magnetorheological fluid configured to contract in a presence of a magnetic field. The tension of the portion of the frame may depend on an amount of contraction of the band. The wearable computing device may adjust a magnitude of the magnetic field applied to the band in response to receiving the output signal. The amount of contraction of the band may depend on the magnitude of the magnetic field.

In an additional example, the frame of the wearable computing device includes a band containing a shape memory alloy configured to contract in a presence of an electric field. The tension of the portion of the frame may depend on an amount of contraction of the band. The wearable computing device may adjust a magnitude of the electric field applied to the band in response to receiving the output signal. The amount of contraction of the band may depend on the magnitude of the electric field.

2. Example System and Device Architecture

FIG. 1A illustrates an example system 100 for receiving, transmitting, and displaying data. The system 100 is shown in the form of a wearable computing device. While FIG. 1A illustrates the system 100 as a head-mounted device as an example of a wearable computing device, other types of wearable computing devices could additionally or alternatively be used. As illustrated in FIG. 1A, the system 100 has frame elements including lens-frames 104, 106 and a center frame support 108, lens elements 110, 112, and extending side-arms 114, 116. The center frame support 108 and the extending side-arms 114, 116 are configured to secure the system 100 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the system 100. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the system 100 to the user. The extending side-arms 114, 116 may further secure the system 100 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the system 100; however, the on-board computing system 118 may be provided on other parts of the system 100 or may be positioned remote from the system 100 (e.g., the on-board computing system 118 could be connected by wires or wirelessly connected to the system 100). The on-board computing system 118 may include a processor and memory, for example. The on-board computing system 118 may be configured to receive and analyze data from the video camera 120, the sensor 122, and the finger-operable touch pad 124 (and possibly from other sensory devices, user-interfaces, or both) and generate images for output by the lens elements 110 and 112. The on-board computing system 118 may additionally include a speaker or a microphone for user input (not shown). An example computing system is further described below in connection with FIG. 4.

The video camera 120 is shown positioned on the extending side-arm 114 of the system 100; however, the video camera 120 may be provided on other parts of the system 100. The video camera 120 may be configured to capture images at various resolutions or at different frame rates. Video cameras with a small form-factor, such as those used in cell phones or webcams, for example, may be incorporated into an example embodiment of the system 100.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the system 100; however, the sensor 122 may be positioned on other parts of the system 100. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the system 100. However, the finger-operable touch pad 124 may be positioned on other parts of the system 100. Also, more than one finger-operable touch pad may be present on the system 100. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
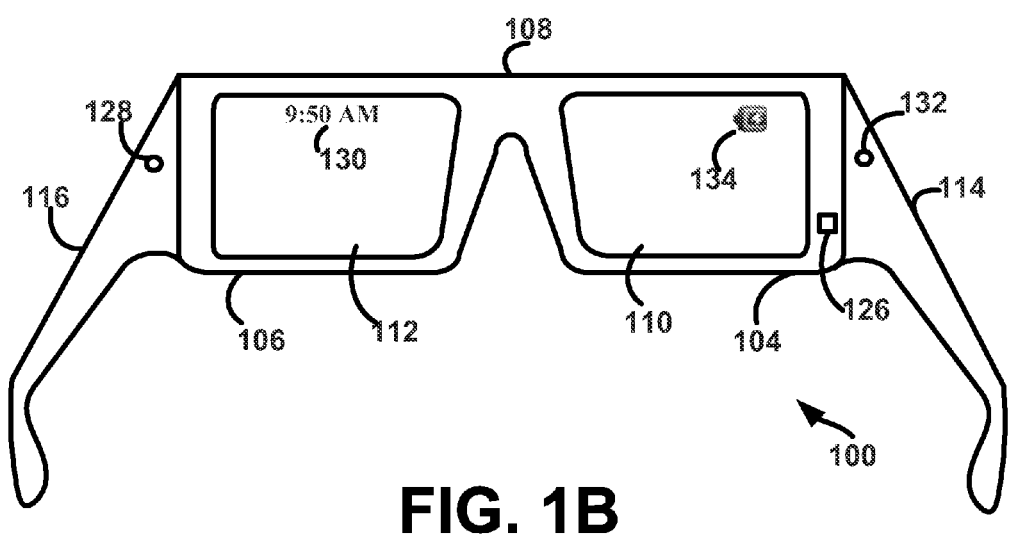
FIG. 1B illustrates an alternate view of the system illustrated in FIG. 1A.

FIG. 1B illustrates an alternate view of the system 100 illustrated in FIG. 1A. The system 100 may include a detector 126. The detector 126 may be, for example, a camera configured to capture images and/or videos in one or more portions of the electromagnetic spectrum (e.g. visible light, infrared, etc.). In one example, the detector 126 may be an eye-facing detector configured to detect the presence or movement of a user's eye. In another example, the detector 126 may be a motion sensing input device that uses, for example, an infrared projector and camera. Thus, the detector 126 may, in some examples, capture three-dimensional (3D) data.

The detector 126 may also include various lenses, optics, or other components to alter the focus and/or direction of the detector 126. Although the detector 126 is shown coupled to an inside surface of the frame element 104, one or more components may be coupled to the frame elements 104, 106, and 108 and/or the extending side-arms 114, 116 in place of and/or in addition to the detector 126 as well.

As shown in FIG. 1B, the lens elements 110, 112 may act as display elements. The system 100 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may be omitted (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. Other possibilities exist as well.

Figure 2A:
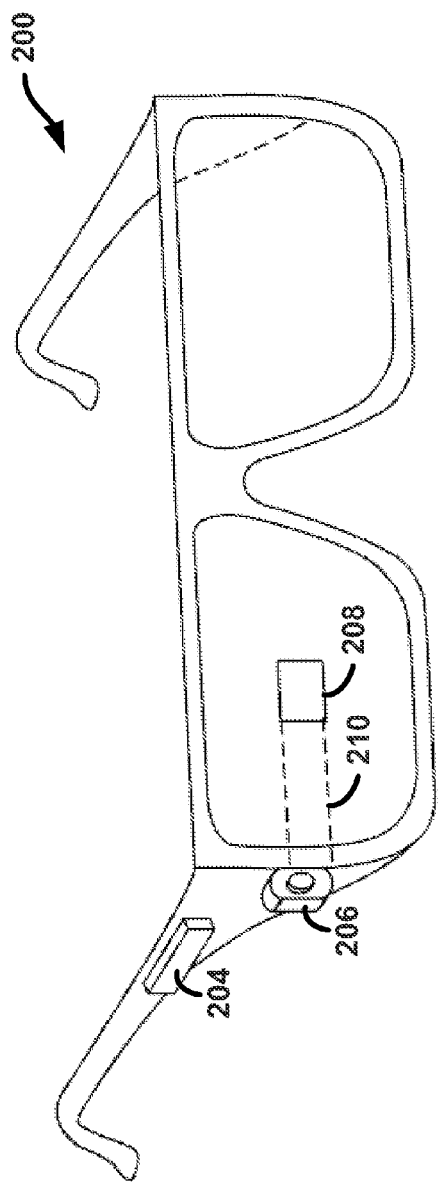
FIG. 2A illustrates another example system for receiving, transmitting, and displaying data.

FIG. 2A illustrates an example system 200 for receiving, transmitting, and displaying data. The system 200 is shown in the form of a wearable computing device. The system 200 may include frame elements and side-arms such as those described with respect to FIGS. 1A and 1B. The system 200 may additionally include an on-board computing system 204 and a video camera 206, such as those described with respect to FIGS. 1A and 1B. The video camera 206 is shown mounted on a frame of the system 200; however, the video camera 206 may be mounted at other positions as well.

As shown in FIG. 2A, the system 200 may include a single display 208 which may be coupled to the device. The display 208 may be formed on one of the lens elements of the system 200, such as a lens element described with respect to FIGS. 1A and 1B, and may be configured to overlay computer-generated graphics in the user's view of the physical world. The display 208 is shown to be provided in a center of a lens of the system 200, however, the display 208 may be provided in other positions. The display 208 is controllable via the computing system 204 that is coupled to the display 208 via an optical waveguide 210.

Figure 2B:
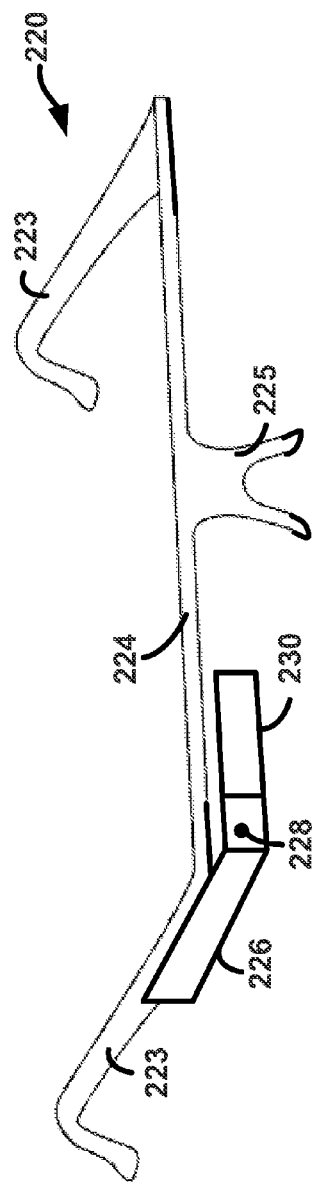
FIG. 2B illustrates yet another example system for receiving, transmitting, and displaying data.

FIG. 2B illustrates an example system 220 for receiving, transmitting, and displaying data. The system 220 is shown in the form of a wearable computing device. The system 220 may include side-arms 223, a center frame support 224, and a bridge portion with nosepiece 225. In the example shown in FIG. 2B, the center frame support 224 connects the side-arms 223. The system 220 does not include lens-frames containing lens elements. The system 220 may additionally include an on-board computing system 226 and a video camera 228, such as those described with respect to FIGS. 1A and 1B.

The system 220 may include a single lens element 230 that may be coupled to one of the side-arms 223 or the center frame support 224. The lens element 230 may include a display such as the display described with reference to FIGS. 1A and 1B, and may be configured to overlay computer-generated graphics upon the user's view of the physical world. In one example, the single lens element 230 may be coupled to a side of the extending side-arm 223. The single lens element 230 may be positioned in front of or proximate to a user's eye when the system 220 is worn by a user. For example, the single lens element 230 may be positioned below the center frame support 224, as shown in FIG. 2B.

FIG. 3 shows a simplified block diagram of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, the device 310 may be a heads-up display system, such as the system 100, 200, or 220 described with reference to FIGS. 1A-2B.

Thus, the device 310 may include a display system 312 comprising a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a microprocessor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. Additionally, the remote device 330 may be an additional heads-up display system, such as the systems 100, 200, or 220 described with reference to FIGS. 1A-2B. The remote device 330 and the device 310 may contain hardware to enable the communication link 320, such as processors, transmitters, receivers, antennas, etc.

In FIG. 3, the communication link 320 is illustrated as a wireless connection, however, wired connections may also be used. For example, the communication link 320 may be a wired serial bus such as a universal serial bus or a parallel bus, among other connections. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 330 may be accessible via the Internet and may include a computing cluster associated with a particular web service (e.g., social-networking, photo sharing, address book, etc.).

Figure 4:
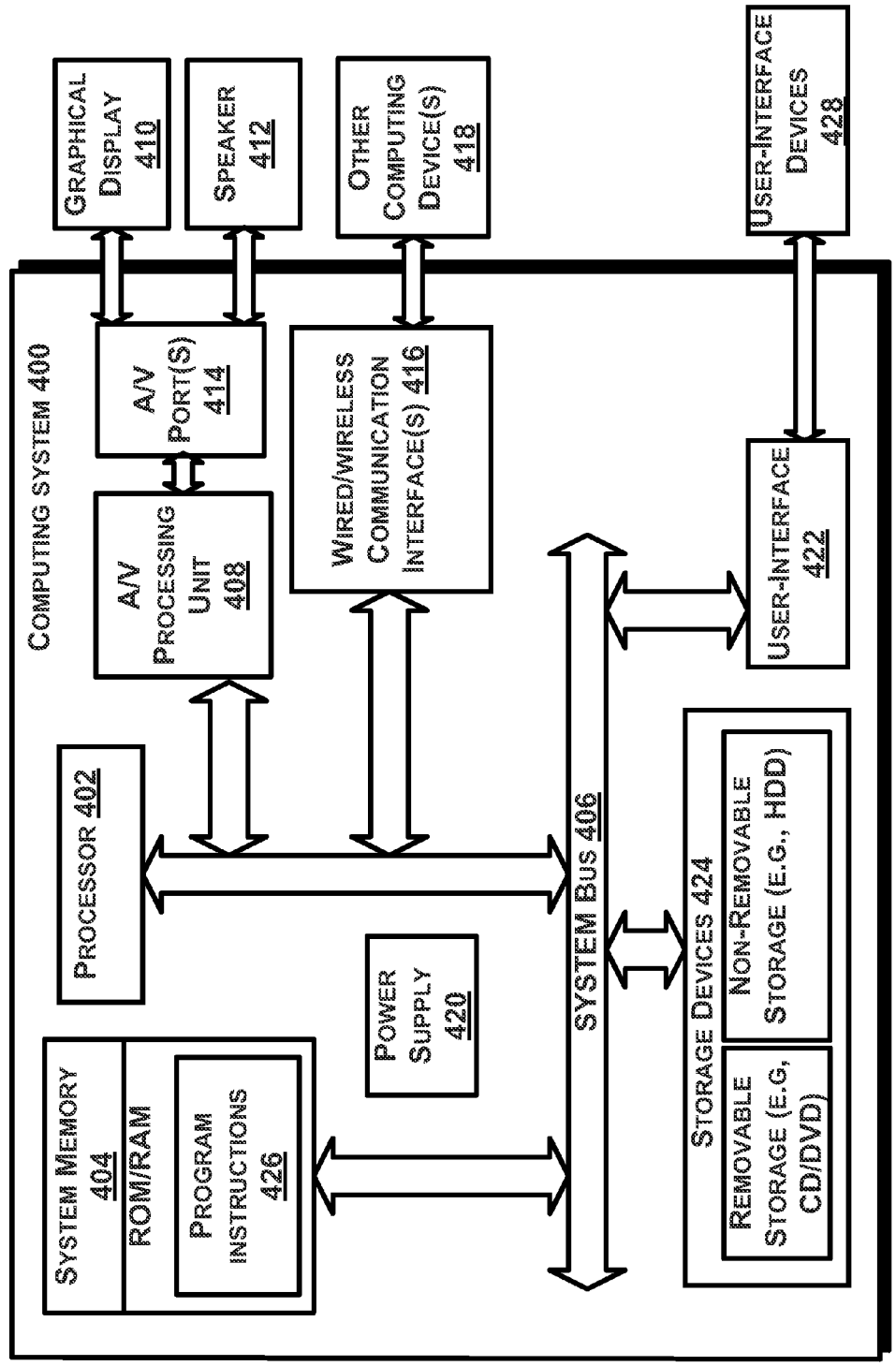
FIG. 4 illustrates a simplified block diagram depicting example components of an example computing system.

As described above in connection with FIGS. 1A-2B, an example wearable computing device may include, or may otherwise be communicatively coupled to, a computing system, such as computing system 118 or computing system 204. FIG. 4 shows a simplified block diagram depicting example components of an example computing system 400. One or both of the device 310 and the remote device 330 may take the form of computing system 400.

Computing system 400 may include at least one processor 402 and system memory 404. In an example embodiment, computing system 400 may include a system bus 406 that communicatively connects processor 402 and system memory 404, as well as other components of computing system 400. Depending on the desired configuration, processor 402 can be any type of processor including, but not limited to, a microprocessor (μP), a microcontroller (μC), a digital signal processor (DSP), or any combination thereof. Furthermore, system memory 404 can be of any type of memory now known or later developed including but not limited to volatile memory (such as RAM), non-volatile memory (such as ROM, flash memory, etc.) or any combination thereof.

An example computing system 400 may include various other components as well. For example, computing system 400 includes an A/V processing unit 408 for controlling graphical display 410 and speaker 412 (via A/V port 414), one or more communication interfaces 416 for connecting to other computing devices 418, and a power supply 420. Graphical display 410 may be arranged to provide a visual depiction of various input regions provided by user-interface module 422. For example, user-interface module 422 may be configured to provide a user-interface, and graphical display 410 may be configured to provide a visual depiction of the user-interface. User-interface module 422 may be further configured to receive data from and transmit data to (or be otherwise compatible with) one or more user-interface devices 428.

Furthermore, computing system 400 may also include one or more data storage devices 424, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 400.

According to an example embodiment, computing system 400 may include program instructions 426 that are stored in system memory 404 (and/or possibly in another data-storage medium) and executable by processor 402 to facilitate the various functions described herein including, but not limited to, those functions described with respect to FIGS. 5-9. Although various components of computing system 400 are shown as distributed components, it should be understood that any of such components may be physically integrated and/or distributed according to the desired configuration of the computing system.

3. Example Method for Dynamically Adjusting the Tension of a Frame

Figure 5:
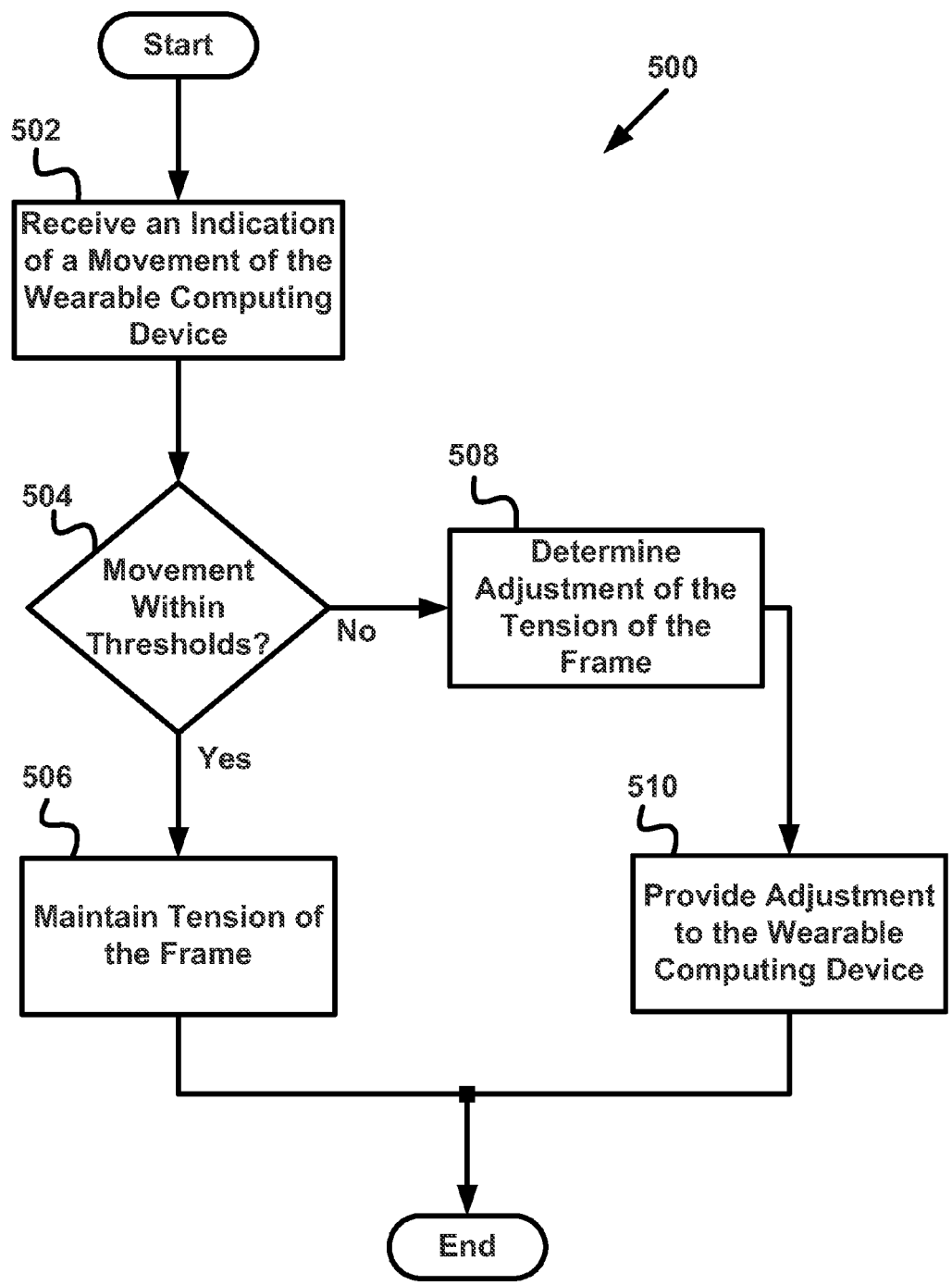
FIG. 5 is a block diagram of an example method for dynamically adjusting a tension of a frame of a wearable computing device.

FIG. 5 is a block diagram of an example method 500 for dynamically adjusting a tension of a frame of a wearable computing device. The method 500 shown in FIG. 5 presents an embodiment of a method that could be used with any of the systems of FIGS. 1-4, for example, and may be performed by a wearable computing device or component of a wearable computing device, such as one of the head-mounted devices illustrated in FIGS. 1-4. Additionally, the method 500 may be performed by a computing device configured to communicate with a wearable computing device. The method 500 may include one or more operations, functions, or actions as illustrated by one or more of blocks 502-510. Although the blocks are illustrated in sequential order, these blocks may be performed in parallel and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable media, for example, such as a computer-readable media that stores data for short periods of time, such as register memory, processor cache, or Random Access Memory (RAM). The computer-readable medium may also include non-transitory media, such as secondary or persistent long term storage, such as read-only memory (ROM), optical or magnetic discs, compact-disc read-only memory (CD-ROM), or the like. The computer-readable medium may also include any other volatile or non-volatile storage systems. The computer-readable medium may be considered a computer-readable storage medium, for example, or a tangible storage device.

In addition, for the method 500 and other processes and methods disclosed herein, each block of FIG. 5 may represent circuitry that is wired to perform the specific logical functions of the process.

At block 502, the method 500 includes receiving an indication of a movement of the wearable computing device. The wearable computing device may include a component configured to determine a movement of the wearable computing device. The component may determine the movement of the wearable computing device, and a computing device may receive a signal from the component indicative of the movement of the wearable computing device. In one example, the computing device may be a component of the wearable computing device. In another example, the computing device may be a component of an electronic device configured to communicate with the wearable computing device, such as the remote device 330 depicted in FIG. 3.

Figure 6:
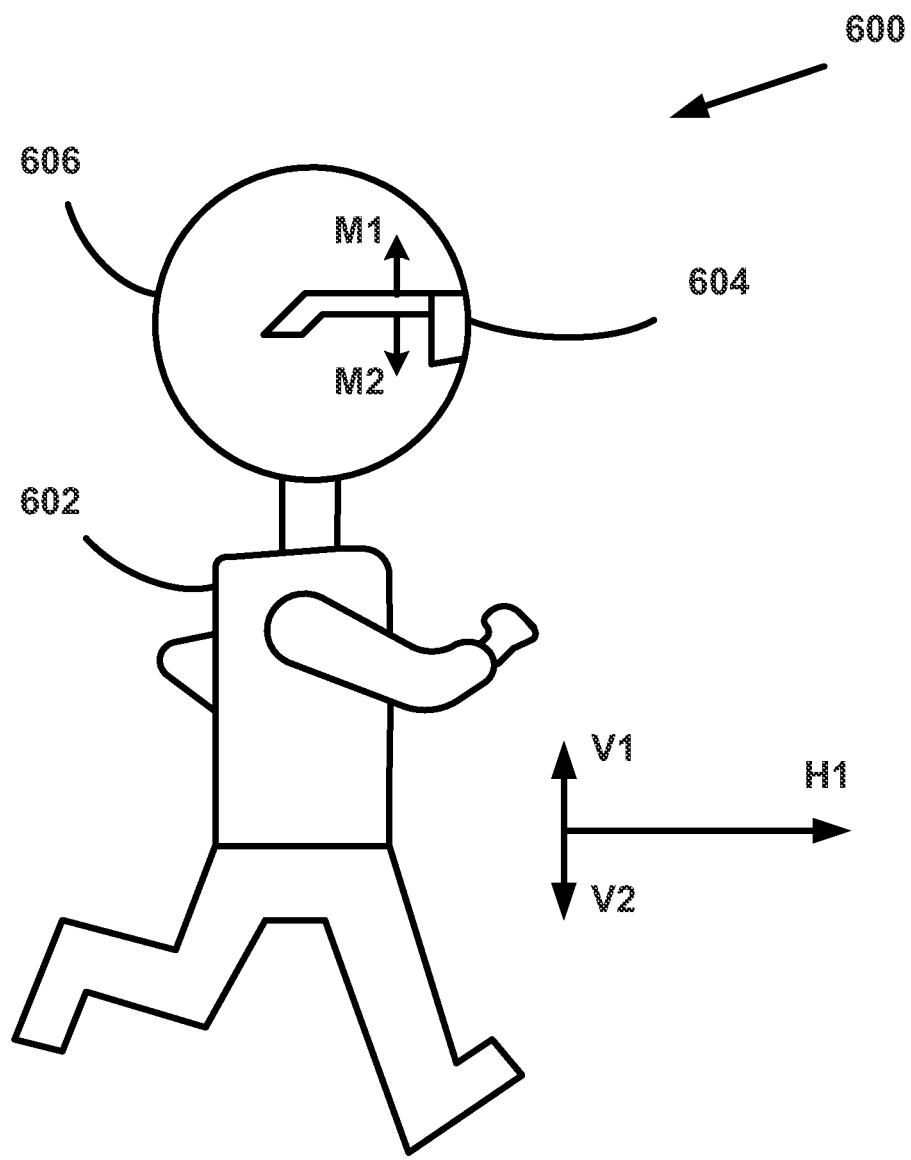
FIG. 6 is a conceptual illustration of an example movement of the wearable computing device.

The movement of the wearable computing device may be about the same as the movement of a user of the wearable computing device. The movement of the wearable computing device may also be relative to the user. FIG. 6 is a conceptual illustration of a movement of the wearable computing device. FIG. 6 includes a view 600 of a user 602 who is jogging while wearing a wearable computing device 604 on the user's head 606. In this example, the wearable computing device 604 includes a head-mounted display, such as one of the head-mounted displays 100, 200, and 220 depicted in FIGS. 1A-2B. The wearable computing device 604 may also include a component configured to determine the movement of the wearable computing device.

The user 602 may have a horizontal velocity and a vertical velocity as the user 602 jogs. As one of the user's 602 legs pushes off the ground at the beginning of a stride, the user 602 may have an upward vertical velocity (V1) and a forward horizontal velocity (H1). When the user's 602 other leg impacts the ground at the end of the stride, the user 602 may have a downward vertical velocity (V2). The component may determine the movement of the wearable computing device 604 based on one of the horizontal velocity and the vertical velocity of the user 602.

In one example, the component may include an inertial measurement unit (IMU), such as the sensor 122 depicted in FIG. 1A. The IMU may include an accelerometer configured to determine an acceleration of the wearable computing device 604 in one dimension. The component may determine the movement of the wearable computing device 604 based on the acceleration in the one dimension as the user 602 jogs. In another example, the component may include an IMU configured to measure a velocity of the wearable computing device. The IMU may include an accelerometer and a gyroscope. The IMU may determine a velocity of the wearable computing device 604 as the user 602 jogs, and the component may determine the movement of the wearable computing device 604 based on the velocity. In yet another example, the component may include a global positioning system (GPS) receiver. The GPS receiver may determine a plurality of positions of the wearable computing device 604 over a period of time as the user 602 jogs, and the component may determine the velocity of the wearable computing device 604 based on a change in the plurality of positions over the period of time.

Additionally, the component may determine the movement of the wearable computing device 604 based on a movement of the wearable computing device 604 relative to the user's head 606. If the wearable computing device 604 is loosely secured to the user's head, the wearable computing device 604 may move up (M1) and down (M2) on the user's head 606 when, for instance, one of the user's 602 legs impacts the ground at the end of the stride. The component may determine the movement of the wearable computing device based on the movement of the wearable computing device 604 on the user's head 606.

In one example, the wearable computing device 604 may also include a component configured to determine the movement of the wearable computing device 604 by determining a drift in the location of one of the user's eyes. In this example, the component may include an image capture device, such as the detector 126 depicted in FIG. 1B. When the user 602 wears the wearable computing device 6004, a field of view of the image capture device may include one of the user's 602 eyes. The component may identify a location of the pupil of the eye and an outline of the eye from information corresponding to the field of view of the image capture device. The component may determine the drift of the pupil by comparing a plurality of locations of the pupil relative to the outline of the eye identified over a period of time. The component may determine the movement of the wearable computing device 604 based on the drift of the pupil.

Returning to FIG. 5, the method 500 includes determining whether the movement of the wearable computing device is within a first threshold and a second threshold, at block 504. In one example, if the movement is greater than the first threshold, the frame of the wearable computing may be too loose; the frame may not have enough tension to secure the wearable computing device to the user's head. Additionally, if the movement is less than a second threshold, the frame of the wearable computing device may be too tight; the frame may have more tension than is necessary to comfortably secure the wearable computing device to the user's head. Upon determining that the movement is within the first threshold and the second threshold, the tension of the frame is maintained, at block 506. Otherwise, an adjustment of the tension of the frame is determined, at block 508.

In one example, the first threshold and the second threshold may be established at a point of manufacture of the wearable computing device. The computing device may store the first threshold and the second threshold in a data storage, such as the system memory 404 depicted in FIG. 4.

In another example, the first threshold and the second threshold may depend on a tension mode of the wearable computing device. The wearable computing device may include a head-mounted display, such as one of the head-mounted displays 100, 200, and 220 depicted in FIGS. 1A-2B, and an input interface component, such as the finger-operable touch pad 124 depicted in FIG. 1A. To select the tension mode, the user may interact with a menu displayed on a surface of the head-mounted display, such as one of the lenses 110, 112 of FIGS. 1A-1B, the display 208 depicted in FIG. 2A, and the lens element 230 depicted in FIG. 2B. In this example, the computing device may determine that the tension mode of the wearable computing device is the tension mode selected by the user.

Alternatively, the computing device may determine the tension mode of the wearable computing device based on an activity being performed by the user. The computing device may determine the activity being performed by the user based on a plurality of factors which may the movement of the wearable computing device, a geographic location of the wearable computing device, and any additional factors suitable for determining the activity being performed by the user. For example, the computing device may determine that the user of the wearable computing device is jogging based on the indication of the movement of the wearable computing device. The computing device may determine the tension mode of the wearable computing device based on a determination that the user is jogging.

In one example, the wearable computing device may include a component, such as the sensor 122 depicted in FIG. 1A, configured to determine a geographic location of the wearable computing device. In one example, the component may include at least one of an altimeter and a GPS receiver. The computing device may receive a signal from the component that includes information indicative of the geographic location of the wearable computing device. The computing device may make a determination of the activity being performed by the user based on the geographic location, and the computing device may determine the tension mode based on the determination of the activity being performed by the user.

In another example, the component may include an image capture device, such as one of the cameras 120, 206, and 228 depicted in FIGS. 1A, 2A-2B, respectively. The image capture device may have a field of view of an environment, and the computing device may receive information from the component corresponding to the field of view. The computing device may employ an object recognition technique to identify an object in the environment from the information corresponding to the field of view. The computing device may make the determination of the geographic location of the wearable computing device based on the object identified in the environment, and the computing device may make a determination of the activity being performed by the user based on the geographic location.

For instance, the computing device may receive a signal from the component indicating that the user of the wearable computing device is on a mountain. The signal may also include a rate of change of the altitude of the wearable computing device and information corresponding to a field of view of an image capture device. Based on the information included in the signal, the computing device may make a determination of the activity being performed by the user, such as hiking, skiing, driving, or any other activity that the user may perform at the geographical location.

Alternatively, the wearable computing device may determine the activity being performed by the user based on an activity profile. In one example, a component of the wearable computing device may include an IMU that is configured to determine at least one of an acceleration and a velocity of the wearable computing device in at least one dimension. The component may receive information from the IMU indicative of at least one of the acceleration and the velocity of the wearable computing device in the at least one dimension over a period of time. The component may develop an activity profile based on the information received from the IMU, and the component may send a signal to the computing device indicative of the activity profile.

The data storage of the computing device may store a plurality of activity profiles corresponding to a plurality of user activities. In one example, each of the plurality of activity profiles may be based on a standard activity profile for each user activity. For instance, the plurality of activity profiles may include a standard activity profile for the following activities: walking, jogging, bicycling, skiing, and driving. The computing device may determine the activity being performed by the user by identifying the user activity corresponding to the activity profile from the plurality of user activities.

The standard activity profile may apply to any user of the wearable computing device. Alternatively, the data storage may store a plurality of standard activity profiles for a plurality of users. In one example, the plurality of standard activity profiles may include a first set of standard activity profiles and a second set of standard activity profiles. If the user of the wearable computing device is an adult male, the computing device may access the first set of standard activities profiles when determining the activity being performed by the user. If the user of the wearable computing device is an adult female, the computing device may access the second set of standard activities profiles when determining the activity being performed by the user. In another example, the plurality of standard activity profiles may include one or more additional sets of standard activity profiles based on the user's age, weight, height, or any other factor upon which a standard activity profile may be based.

The data storage may also store a user-specific activity profile for a user activity. For instance, the user may interact with a display and an interface component, such as the lenses 110, 112 and touchpad 124 depicted in FIGS. 1A-1B, to cause the computing device to record a jogging activity profile while the user is jogging. The component may receive information from the IMU indicative of at least one of the acceleration and the velocity of the wearable computing device in the at least one dimension while the user is jogging. The component may generate the jogging activity profile based on the information received from the IMU, and the component may send a signal indicative of the jogging activity profile to the computing device. The computing device may receive the signal indicative of the jogging activity profile and may store the jogging activity profile in the data storage. The computing device may either store the jogging activity profile as a new activity profile in the plurality of activity profiles or may replace a standard jogging activity profile already stored in the data storage.

The computing device may determine the tension mode based on a determination of a current activity being performed by the user. The data storage may store a plurality of tension modes corresponding to the plurality of user activities. In one example, the tension mode for each user activity may be standardized for all users of the wearable computing device. In another example, the tension mode for each user activity may vary depending on the user of the wearable computing device.

In still another example, the tension mode for each user activity may be determined by the user. For instance, the user may interact with the computing device through a display and an interface component, such as the lenses 110, 112 and finger-operable touchpad 124 depicted in FIGS. 1A-1B, to select a specific tension mode for a specific user activity. The computing device may store the specific tension mode corresponding to the specific user activity in the plurality of tension modes stored in the data storage. The computing device may access the data storage to identify the tension mode corresponding to the current activity from the plurality of tension modes.

Once the computing device determines the tension mode, the computing device may determine the first threshold and the second threshold based on the tension mode. In one example, the data storage may store a plurality of first thresholds and the second thresholds corresponding to a plurality of tension modes. The wearable computing device may access the data storage to identify the first threshold and second threshold from the plurality of first thresholds and second thresholds corresponding to the tension mode. In another example, the computing device may determine the first threshold and the second threshold based on a plurality of factors. The plurality of factors may include the movement of the wearable computing device, the tension mode, and any additional factors suitable for determining the first threshold and the second threshold.

For each tension mode, the first threshold and the second threshold may be standardized for all users of the wearable computing device. Alternatively, the first threshold and the second threshold for the each tension mode may vary depending on the user of the wearable computing device. For instance, for a given tension mode, a first threshold and a second threshold for a first user may differ from a first threshold and a second threshold for a second user. Additionally, the user of the wearable computing device may interact with computing device through a display and an interface component, such as the lenses 110, 112 and finger-operable touchpad 124 depicted in FIGS. 1A-1B, to assign a first user threshold and a second user threshold for the given tension mode. The user may also interact with the computing device through the display and the interface component to change at least one of the first threshold and the second threshold for a tension mode based on a standard activity profile.

At block 508, the method 500 includes determining the adjustment to the tension of the frame of the wearable computing device. Following, the method 500 includes providing the adjustment of the tension of the frame to the wearable computing device, at block 510. The computing device may provide an output signal to the wearable computing device indicative of the adjustment. The wearable computing device may adjust the tension of at least a portion of the frame in response to receiving the output signal.

Figure 7:
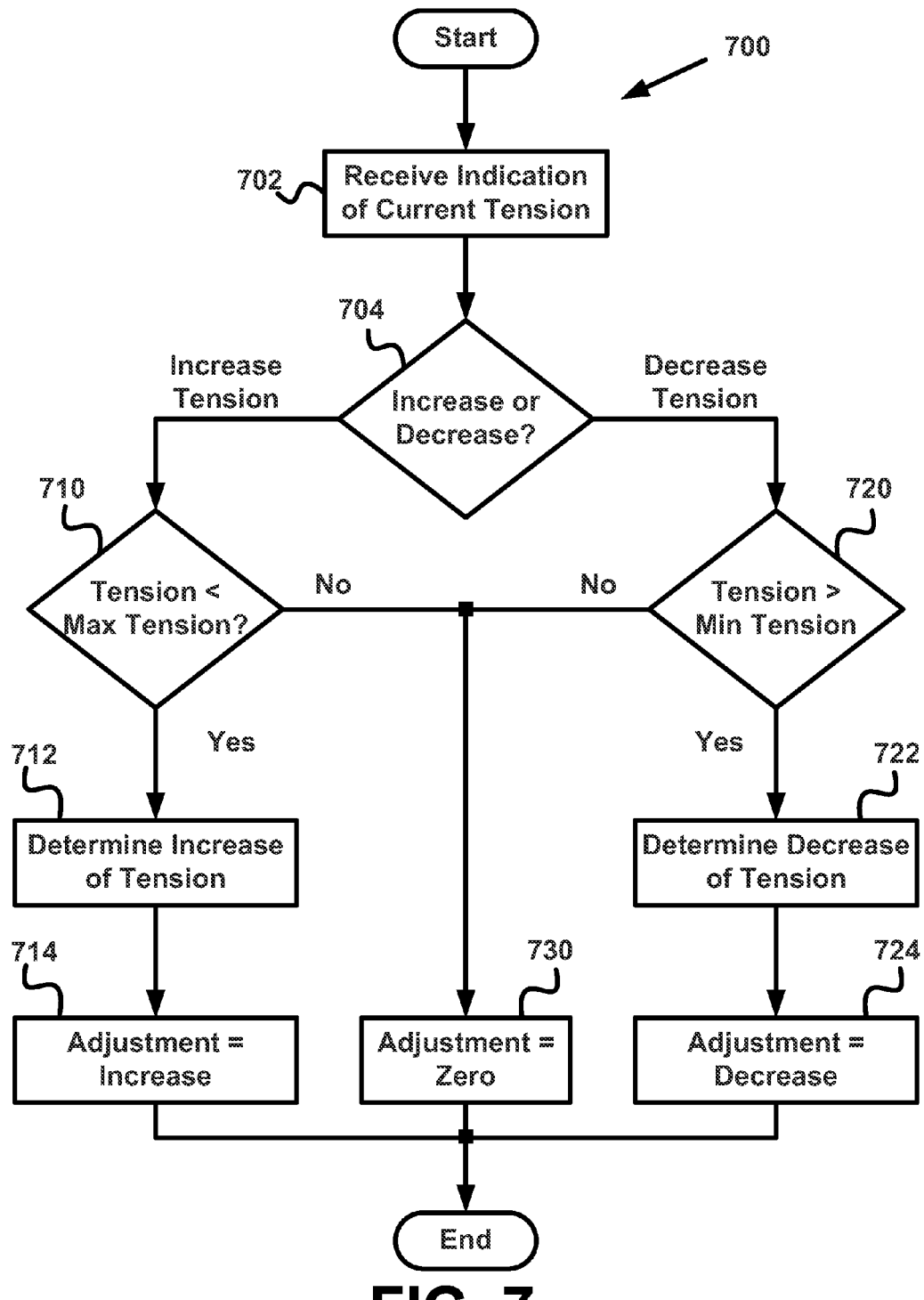
FIG. 7 is a block diagram of an example method for determining an adjustment of a tension of a frame of a wearable computing device.

FIG. 7 is a block diagram of an example method 700 for determining an adjustment of a tension of at least a portion of a frame of a wearable computing device. The method 700 shown in FIG. 7 presents an embodiment of a method that could be used with any of the systems of FIGS. 1-4, for example, and may be performed by a wearable computing device or component of a wearable computing device, such as one of the head-mounted devices illustrated in FIGS. 1-4. Additionally, the method 700 may be performed by a computing device configured to communicate with a wearable computing device. The method 700 may include one or more operations, functions, or actions as illustrated by one or more of blocks 702-730. Although the blocks are illustrated in sequential order, these blocks may be performed in parallel and/or in a different order than those described herein. Also, the various blocks may be combined into fewer blocks, divided into additional blocks, and/or removed based upon the desired implementation.

At block 702, the method 700 includes identifying a current tension of the frame of the wearable computing device. In one example, the current tension is stored in a data storage, such as the system memory 404 depicted in FIG. 4. A computing device may access the data storage in order to identify the current tension. In one example, the computing device may be a component of the wearable computing device. In another example, the computing device may be a component of an electronic device configured to communicate with the wearable computing device, such as the remote device 330 depicted in FIG. 3.

The wearable computing device may also include a component configured to determine the current tension of the frame. In one example, the component includes a flex sensor embedded in a portion of the frame that is configured to determine an amount of flex of the portion of the frame. The flex sensor may determine a current flex of the portion of the frame, and the component may send a signal to the computing device that includes information indicative of the current flex of the portion of the frame. The computing device may determine the current tension of the frame based on the information indicative of the current flex of the portion of the frame.

In another example, the component may include a pressure sensor configured to determine an amount of pressure exerted by a portion of the frame. When a user wears the wearable computing device on the user's head, the pressure sensor may contact the user's head. The pressure sensor may determine an amount of pressure exerted by the portion of the frame on the user's head. The computing device may identify the current tension of the frame based on a signal received from the component indicative of the pressure exerted by the portion of the frame on the user's head.

In yet another example, the component may include a tactile switch located on an inside of a portion of the frame of the wearable computing device. When a user wears the wearable computing device on the user's head, the tactile switch may contact the user's head. The tactile switch may be configured to depress once the pressure exerted by the frame on the user's head reaches a threshold pressure. The component may send the computing device a signal indicative of the status of the tactile switch (e.g., depressed or not depressed). The computing device may determine the current tension of the frame based on the status of the tactile switch.

In still another example, the component may include one or more tactile switches. The one or more tactile switch may be spaced along the inside portion of the frame. The one or more tactile switches may each have a different threshold pressures at which the one or more tactile switches are depressed. The component may send a signal to the computing device indicative of the status of the one or more tactile switches. The computing device may determine the current tension of the frame based on the status of the one or more tactile switches.

At block 704, the method 700 includes determining whether to increase the tension or to decrease the tension of the frame. The computing device may determine whether to increase or decrease the tension of the frame based on a comparison of the movement of the wearable computing device to the first threshold and the second threshold, as discussed with respect to block 504 of the method 500. If the movement of the wearable computing device is greater than the first threshold, the computing device may increase the tension of the frame by proceeding to block 710. If the movement of the wearable computing device is less than the second threshold, the computing device may decrease the pressure of the frame by proceeding to block 720.

The tension of the frame may be adjustable within a minimum tension and a maximum tension. In one example, a portion of the frame may apply about 100 grams of pressure to the user's head at the minimum tension and about 300 grams of pressure to the user's head at the maximum tension. In another example, the minimum tension may vary such that the portion of the frame may apply pressures from about 100 grams of pressure to about 200 grams of pressure to the user's head. The maximum tension may vary such that the portion of the frame may apply pressures from about 200 grams of pressure to about 300 grams of pressure to the user's head. In yet another example, the minimum tension and the maximum tension may include any range of tensions suitable for securing a wearable computing device to a user's head.

At block 710, the method 700 includes determining whether the current tension of the frame is less than a maximum tension. The maximum tension may be the maximum amount of tension that can be exerted by the portion of the frame of the wearable computing device. The maximum tension may be determined at the point of manufacture of the wearable computing device.

In one example, the data storage may store the maximum tension. The computing device may access the data storage to identify the maximum tension, and the wearable computing device may compare the maximum tension to the current tension. If the current tension is less than the maximum tension, an increase of the tension may be determined, at block 712. If the current tension is not less than the maximum tension, than the tension of the frame may be the maximum tension and may not be increased. In this situation, the computing device may assign a value of zero to the adjustment of the tension, at block 730.

At block 712, the method 700 includes determining the increase of the tension of the portion of the frame of the wearable computing device. In one example, the increase of the tension may be an incremental increase of the tension of determined at the point of manufacture of the wearable computing device. The data storage may store the incremental increase. The computing device may access the data storage to identify the incremental increase and determine that the increase of the tension is the incremental increase.

In another example, the increase of the tension may depend on the tension mode of the wearable computing device. The data storage may store a plurality of increases of the tension corresponding to a plurality of tension modes. In this example, a first increase of the tension for a first tension mode may differ from a second increase of the tension for a second tension mode. The computing device may access the data storage to identify an increase of the tension corresponding to the tension mode from the plurality of increases of the tension. The computing device may determine that the increase of the tension is the increase of the tension corresponding to the tension mode.

An increase of the tension for each tension mode may be standardized for all users of the wearable computing device. Alternatively, the increase of the tension for each tension mode may vary based on the user of the wearable computing device. For instance, a given tension mode may include a first increase of the tension corresponding to a first user and a second increase of the tension corresponding to a second user. Additionally, the user may interact with the computing device through a display and an interface component, such as the lenses 110, 112 and the finger-operable touchpad 124 depicted in FIGS. 1A-1B, to select the increase in the tension for a specific tension mode.

In an additional example, a tension mode may include a final tension that is the tension of the frame for the tension mode. The computing device may determine the increase in the tension by determining the difference between the final tension and the current tension.

In still another example, the increase of the tension may depend on the movement of the wearable computing device. The increase of the tension may be based on a difference between the movement of the wearable computing device and the first threshold, or at least on a comparison of the movement of the wearable computing device and the first threshold. The data storage may store a plurality of increases of the tension corresponding to a plurality of differences between the movement of the wearable computing device and the first threshold. The computing device may determine the difference between the movement of the wearable computing device and the first threshold. The computing device may access the data storage to identify the increase of the tension that corresponds to the difference between the movement of the wearable computing device and the first threshold from the plurality of increases of the tension. The computing device may determine that the increase of the tension is the increase of the tension corresponding to the difference between the movement of the wearable computing device and the first threshold.

In yet another example, the computing device may determine the increase of the tension based on a plurality of factors. The plurality of factors may include the current tension, the tension mode, the movement of the wearable computing device, a geographic location of the wearable computing device, and any other factor suitable for determining an increase of the tension of the frame of the wearable computing device.

At block 714, the method 700 may include assigning the increase of the tension to the adjustment of the tension.

At block 720, the method 700 includes determining whether the current tension of the frame is greater than a minimum tension. The minimum tension may be the minimum amount of tension that can be exerted by the portion of the frame of the wearable computing device. The minimum tension may be determined at the point of manufacture of the wearable computing device.

In one example, the data storage may store the minimum tension. The computing device may access the data storage to identify the minimum tension, and the computing device may compare the minimum tension to the current tension. If the current tension is greater than the minimum tension, a decrease of the tension may be determined, at block 722. If the current tension is not greater than the minimum tension, than the tension of the frame may be the minimum tension and may not be decreased. In this situation, the computing device may assign a value of zero to the adjustment of the tension, at block 730.

At block 722, the method 700 includes determining the decrease of the tension of the frame of the wearable computing device. In one example, the decrease of the tension may be an incremental decrease of the tension of the frame determined at the point of manufacture of the wearable computing device. The data storage may store the incremental decrease. The computing device may access the data storage to identify the incremental decrease and determine that the decrease of the tension is the incremental decrease.

In another example, the decrease of the tension may depend on the tension mode of the wearable computing device. The data storage may store a plurality of decreases of the tension corresponding to the plurality of tension modes. In this example, a first decrease of the tension for a first tension mode may differ from a second decrease of the tension for a second tension mode. The computing device may access the data storage to identify the decrease of the tension corresponding to the tension mode from the plurality of decreases of the tension. The computing device may determine that the decrease of the tension is the decrease of the tension corresponding to the tension mode.

A decrease of the tension for each tension mode may be standardized for all users of the wearable computing device. Alternatively, the decrease of the tension for each tension mode may vary based on the user of the wearable computing device. For instance, a given tension mode may include a first decrease of the tension corresponding to a first user and a second decrease of the tension corresponding to a second user. Additionally, the user may interact with the computing device through a display and an interface component, such as the lenses 110, 112 and the finger-operable touchpad 124 depicted in FIGS. 1A-1B, to select the given decrease in the tension for a specific tension mode.

In an additional example, a tension mode may include a final tension that is the tension of the frame for the tension mode. The computing device may determine the decrease in the tension by determining the difference between the current tension and the final tension.

In still another example, the decrease of the tension may depend on the movement of the wearable computing device. The decrease of the tension may be based on a difference between the movement of the wearable computing device and the second threshold. The data storage may store a plurality of decreases of the tension corresponding to a plurality of differences between the movement of the wearable computing device and the second threshold. The wearable computing device may determine a difference between the movement of the wearable computing device and the second threshold. The wearable computing device may access the data storage to identify the decrease of the tension that corresponds to the difference between the movement of the wearable computing device and the second threshold from the plurality of decreases of the tension. The wearable computing device may determine that decrease of the tension is the decrease of the tension corresponding to the difference between the movement of the wearable computing device and the second threshold.

In yet another example, the computing device may determine that the decrease of the tension of the frame based on a plurality of factors. The plurality of factors may include the current tension, the tension mode, the movement of the wearable computing device, a geographic location of the wearable computing device, and any other factor suitable for determining the decrease of the tension.

At block 724, the method 700 includes assigning the increase to the adjustment of the tension. Once the adjustment is determined at one of blocks 714, 724, and 730, the method 700 may end.

Figure 8A:
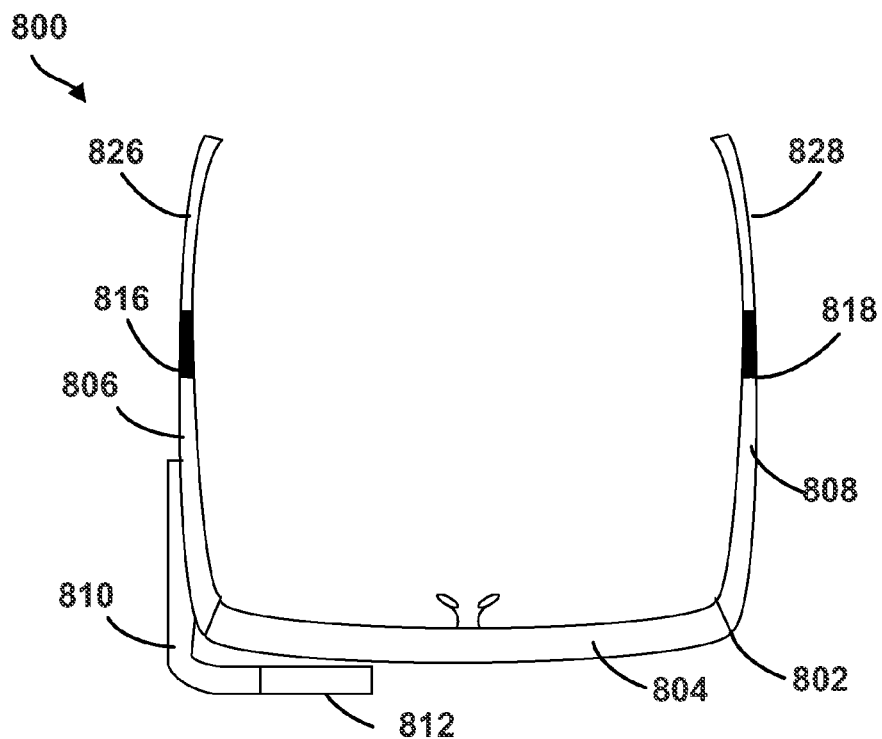
FIGS. 8A-8B illustrate an example of a wearable computing device configured to dynamically adjust a tension of a portion of a frame of a wearable computing device.
Figure 8B:
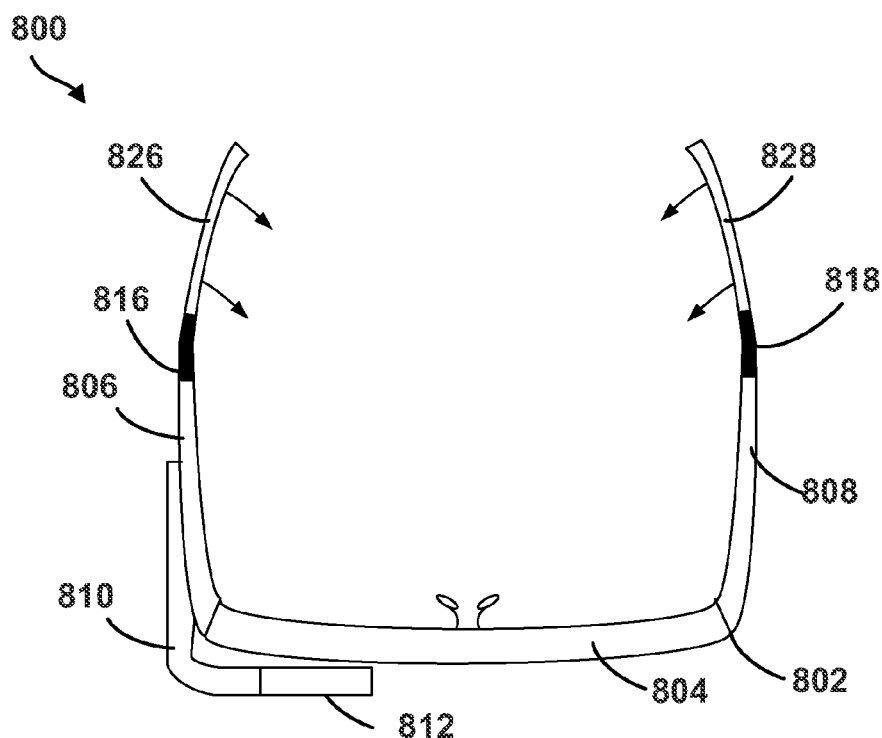

FIGS. 8A-8B illustrate an example of a wearable computing device 800 configured to dynamically adjust a tension of a portion of a frame 802 of the wearable computing device 800. The frame 802 may include a central frame 804 and extending side-arms 806, 808. Additionally, the wearable computing device 800 may include an on-board computing system 810 and a lens element 812 configured to provide a display.

First portions 816, 818 of the side-arms 806, 808 may include a piezoelectric material configured to flex in a presence of an electric field. An amount in which the piezoelectric material flexes may depend on a magnitude of the electric field. That is, the greater the magnitude of the electric field, the greater the amount of flex of the piezoelectric material.

The wearable computing device 800 may apply the electric field to the piezoelectric material in response to receiving an output signal indicative of the adjustment of the tension. The wearable computing device 800 may include a component configured to apply the electric field to the piezoelectric material. In one example, the wearable computing device 800 includes an actuator (not shown) configured to apply the electric field to the piezoelectric material of the first portions 816, 818 of the side-arms 806, 808.

When the wearable computing device applies the electric field to the piezoelectric material, the first portions 816, 818 of the side-arms 806, 808 may flex inward. The first portions 816, 818 flexing inward may cause second portions 826, 828 of the side-arms 806, 808 to move inward, thereby increasing the tension of the side-arms 806, 808. The wearable computing device 800 may adjust the tension of the side-arms 806, 808 by adjusting the magnitude of the electric field.

As shown in FIG. 8A, the first portions 814, 816 of the side-arms 804, 806 may not have any flex; that is, the wearable computing device 800 may not apply an electric field applied to the piezoelectric materials of the first portions 816, 818.

FIG. 8B illustrates the wearable computing device 800 applying the electric field to piezoelectric material of the first portions 816, 818 of the side-arms 806, 808. The wearable computing device 800 may apply the electric field in response to receiving an output signal indicative of an adjustment that includes an increase in the tension of the side-arms 806, 808. In the presence of the electric field, the first portions 816, 818 flex inward, causing the second portions 826, 828 of the side-arms 806, 808 to move inward. As a result, the tension of the side-arms 806, 808 may increase, causing the wearable computing device 800 to be more tightly secured to the user's head.

When the wearable computing device 800 decreases the magnitude of the electric field, the amount of flex of the piezoelectric material of the first portions 816, 818 of the side-arms 806, 808 may decrease. The second portions 826, 828 may move outward in response to the decrease in the flex of the piezoelectric material, which may reduce the tension of the side-arms 806, 808. When the wearable computing device 800 ceases applying the electric field to the piezoelectric material, the frame 802 of the wearable computing device may return to the configuration depicted in FIG. 8A.

In an alternative example, the first portions 816, 818 of the side-arms 806, 808 may not include a piezoelectric material. In this example, the wearable computing device 800 may include a mechanical assembly configured to adjust the tension of the frame, such as a cam and lever assembly. In this example, a cam and level assembly may be embedded in each of the first portions 816, 818 of the side-arms 806, 808, with the lever portion of each assembly extending from the first portions 816, 818 of the side-arms 806, 808 into the second portions 826, 828 of the side-arms 806, 808. Electric motors configured to rotate the cams may also be embedded in each of the side-arms 806, 808, perhaps in the first portions 816, 818 of the side-arms 806, 808.

The electric motors may rotate the cams in response to receiving the output signal from the wearable computing device 800. The electric motors may rotate the cams in a first direction when the output signal is indicative of an increase in the tension of the frame 802. Rotating the cams in the first direction may cause the second portions 826, 828 of the side-arms 806, 808 to move inward, thereby increasing the tension of the frame 802. The electric motors may rotate the cams in a second direction when the output signal is indicative of a decrease in the tension of the frame 802. Rotating the cams in the second direction may cause the second portions 826, 828 of the side-arms 816, 818 to move outward, thereby decreasing the tension of the frame 802.

In yet another example, the wearable computing device 800 may include another mechanical assembly or combination of mechanical assemblies that is suitable for adjusting the tension of at least a portion of the frame 802.

Figure 9A:
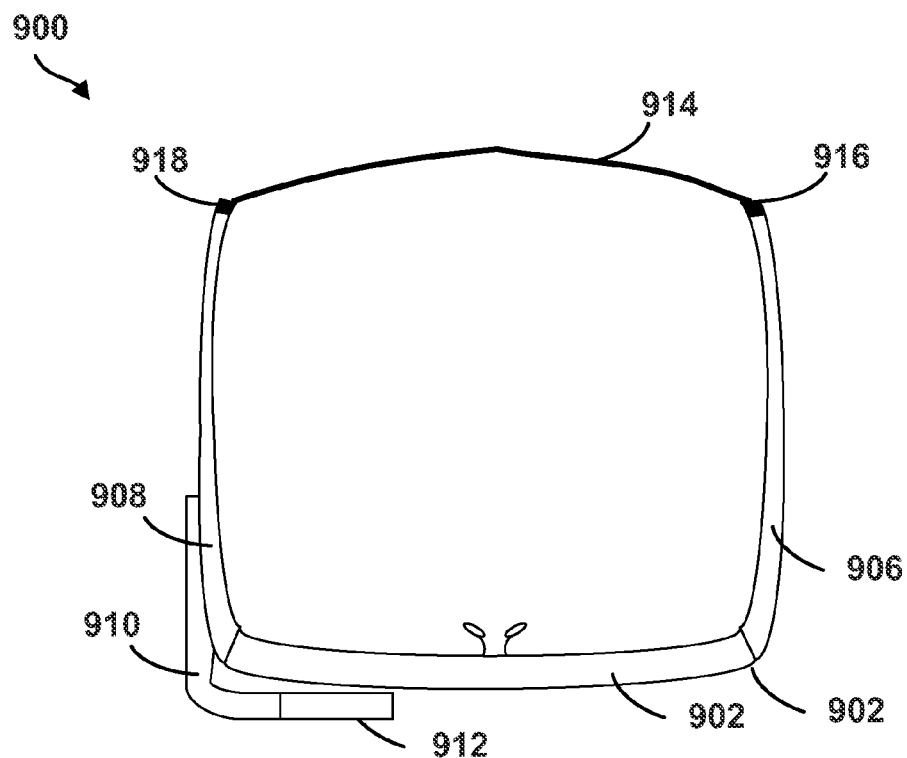
FIGS. 9A-9B illustrate an additional example of a wearable computing device configured to dynamically adjust a tension of a portion of a frame of a wearable computing device.
Figure 9B:
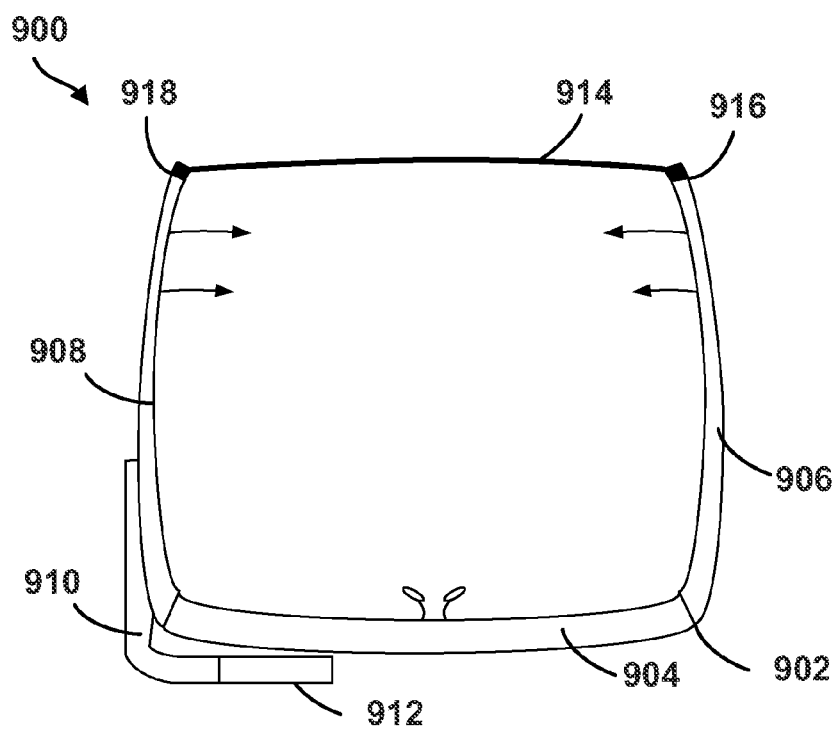

FIGS. 9A-9B illustrate an additional example of a wearable computing device 900 configured to dynamically adjust a tension of a portion of a frame 902 of the wearable computing device 900. The frame 902 may include a central frame 904 and extending side-arms 906, 908. Additionally, the wearable computing device 900 may include an on-board computing system 910 and a lens element 912 configured to provide a display.

A band 914 may connect the side-arms 906, 908. When the wearable computing device 800 is worn, the band 914 may fit over the back of the user's head. In one example, a portion of the band 914 may contain one of a magnetorheological fluid configured to cause the band to contract in a presence of a magnetic field. An amount in which the band 914 contracts may depend on a magnitude of the magnetic field. That is, the greater the magnitude of the magnetic field, the greater the amount in which the band 914 may contract.

The wearable computing device 900 may apply the magnetic field to the band. In one example, actuators 916, 918 are installed in the side-arms 906, 908. The actuators 916, 918 may apply the magnetic field to the band 914 in response to receiving a signal from the wearable computing device 900 indicative of the magnitude of the magnetic field. In another example, the wearable computing device 900 may include any component suitable for applying the magnetic field to the band 914.

When the band 914 contracts in response to the magnetic field, the band 914 may pull the side-arms 906, 908 inward. Pulling the side-arms 906, 908 inward may increase the tension of the side-arms 906, 908. The wearable computing device 900 may adjust the tension of the side-arms 906, 908 by adjusting the magnitude of the magnetic field.

As shown in FIG. 9A, the band 914 may be slack; that is, the wearable computing device 900 may not be applying a magnetic field to the band 914. Additionally, the user of the wearable computing device 900 may adjust a shape of the band 914 by pulling the band. Being able to pull the band 914 when the band is slack may facilitate the user putting the wearable computing device 900 on and taking the wearable computing device 900 off.

FIG. 9B illustrates the wearable computing device 900 applying the magnetic field to the band 914. The wearable computing device 900 may apply the magnetic field in response to receiving an output signal indicative of an adjustment that includes an increase in the tension of the side-arms 906, 908. In the presence of the magnetic field, the band 914 may contract, and the band 914 may pull the side-arms 906, 908 inward. As a result, the tension of the side-arms 906, 908 may increase, causing the wearable computing device 900 to be more tightly secured to the user's head. As the wearable computing device 900 reduces the magnitude of the magnetic field, the amount of contraction of the band 914 may decrease. When the wearable computing device ceases applying the magnetic field to the band 914, the frame 902 and the band 914 may return to the configuration shown in FIG. 9A.

In another example, the band 914 may not contain the magnetorheological fluid. In this example, the band 914 may contain a shape memory alloy configured to cause the band to contract in a presence of an electric field. An amount in which the band 914 contracts may depend on a magnitude of the electric field. That is, the greater the magnitude of the electric field, the greater the amount in which the band 914 may contract. In this example, the actuators 916, 918 may apply the electric field to the band 914 in response to receiving an output signal from the wearable computing device 900 indicative of the magnitude of the electric field. Alternatively, the wearable computing device 900 may include any component suitable for applying the electric field to the band 914.

When the actuators 916, 918 receive an output signal from the wearable computing device 900 indicative of an increase in the tension of the side-arms 906, 908, the actuators may apply the electric field to the band 914. In the presence of the electric field, the band 914 may contract, and the band 914 may pull the side-arms 906, 908 inward, as is illustrated in FIG. 9B. As a result, the tension of the side-arms 906, 908 may increase, causing the wearable computing device 900 to be more tightly secured to the user's head. As the wearable computing device 900 reduces the magnitude of the electric field, the amount of contraction of the band 914 may decrease. When the wearable computing device ceases applying the electric field to the band 914, the frame 902 and the band 914 may return to the configuration shown in FIG. 9A.

In an alternative example, the band 914 may not contain one of the magnetorheological fluid and the shape memory alloy. In this example, the wearable computing device 900 may include a mechanical system for increasing the tension of the frame. In one example, the mechanical system may include a linear actuator, such as a rack and pinion assembly. In this example, the band 914 may contain a linear gear bar. In one example, a first end of the linear gear bar may be anchored to the left side-arm 906. A second end of the linear gear bar may move within a cavity of the right side-arm 908. The linear gear bar may be flexible so as to allow the user pull on the band 914 when placing the wearable computing device 900 on the user's head. A pinion may be embedded in the right side-arm 908, and teeth of the pinion may mesh with teeth of the linear gear bar. An electric motor, which may also be embedded in the right side-arm 908, may be connected to the pinion and may cause the pinion gear to rotate in response to the electric motor receiving the output signal from the wearable computing device 900.

If the output signal is indicative of an increase in the tension of the frame 902, the electric motor may cause the pinion to rotate in a first direction. Causing the pinion to rotate in the first direction may reduce a length of the linear gear bar within the band 914, thereby causing the side-arms 906, 908 to move inward and increasing the tension of the frame 902. If the output signal is indicative of a decrease in the tension of the frame 902, the electric motor may cause the pinion to rotate in a second direction. Causing the pinion to rotate in the second direction may increase the length of the linear gear band within the band 914, thereby moving the side-arms 906, 908 outward and decreasing the tension of the frame 902.

In still another example, the wearable computing device 900 may include a different linear actuator embedded in the frame 902, such as a lead screw. A cord may be embedded in the band 914 and attached at a first end to anchor point on one of the side-arms 906, 908. A second end of the cord may be attached to the lead screw. The lead screw may be connected to an electric motor, which may also be embedded in the frame 902.

The electric motor may rotate the lead screw in a first direction in response to receiving an output signal indicative of an increase in the tension of the frame 902. Causing the lead screw to rotate in the first direction may increase a tension of the cord, thereby causing the side-arms 906, 908 to move inward and increasing the tension of the frame 902. The electric motor may rotate the lead screw in a second direction in response to receiving an output signal indicative of a decrease in the tension of the frame 902. Causing the lead screw to rotate in the second direction may reduce the tension of the cord, thereby causing the side-arms 906, 908 to move outward and decreasing the tension of the frame 902.

In yet another example, the band may contain a line connected to a reel attached to an electric motor that is embedded in one of the side-arms 906, 908. In the example, the line is anchored to one of the side-arms 906, 908. The electric motor may rotate the reel in a first direction in response to receiving an output signal indicative of an increase in the tension of the frame 902. Causing the reel to rotate in the first direction may increase a tension of the line, thereby causing the side-arms 906, 908 to move inward and increasing the tension of the frame 902. The electric motor may rotate the reel in a second direction in response to receiving an output signal indicative of a decrease in the tension of the frame 902. Causing the reel to rotate in the second direction may reduce the tension of the line, thereby causing the side-arms 906, 908 to move outward and decreasing the tension of the frame 902.

In yet an additional example, the wearable computing device 900 may include another mechanical assembly or combination of mechanical assemblies that is suitable for increasing or decreasing the tension of at least a portion of the frame 902.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also understood that the terminology used herein is for the purpose of describing particular embodiments only, and is not intend to be limiting.

What is claimed is:

1. A method comprising:
   receiving an input signal from a component of a wearable computing device that is indicative of a movement of the wearable computing device;
   based on the input signal, determining an adjustment of a tension of a portion of a frame of the wearable computing device, wherein the tension of the portion of the frame is indicative of a tightness of at least the portion of the frame on a head of a user; and
   providing an output signal to the wearable computing device indicative of the adjustment.

2. The method of claim 1, wherein the portion of the frame comprises a piezoelectric material, wherein the piezoelectric material is configured to cause the portion of the frame to flex in a presence of an electric field, and wherein the tension of the portion of the frame is based on an amount of flex of the portion of the frame.

3. The method of claim 2, wherein the wearable computing device is configured to apply the electric field to the piezoelectric material, and wherein the method further comprises:

applying the electric field to the piezoelectric material in response to receiving the output signal, wherein a magnitude of the electric field is based on the output signal.

4. The method of claim 1, wherein the portion of the frame includes a band containing a magnetorheological fluid, wherein the magnetorheological fluid is configured to cause the band to contract in a presence of a magnetic field, and wherein the tension of the portion of the frame is based on an amount of contraction of the band.

5. The method of claim 4, wherein the wearable computing device is configured to apply the magnetic field to the band, and wherein the method further comprises:
applying the magnetic field to the band in response to receiving the output signal, wherein a magnitude of the magnetic field is based on the output signal.

6. The method of claim 1, wherein the portion of the frame includes a band containing a shape memory alloy, wherein the shape memory alloy is configured to cause the band to contract in a presence of an electric field, and wherein the tension of the portion of the frame is based on an amount of contraction of the band.

7. The method of claim 6, wherein the wearable computing device is configured to apply the electric field to the band, and wherein the method further comprises:
applying the electric field to the band in response to receiving the output signal, wherein a magnitude of the electric field is based on the output signal.

8. The method of claim 1, wherein determining the adjustment comprises:
determining an increase in the tension of the portion of the frame based on determining that the movement of the wearable computing device in at least one dimension is greater than a first threshold value, wherein the adjustment includes the increase in the tension of the portion of the frame; and
determining a decrease in the tension of the portion of the frame based on determining that the movement of the wearable computing device in the at least one dimension is less than a second threshold value, wherein the adjustment includes the decrease in the tension of the portion of the frame.

9. The method of claim 8, further comprising:
determining a tension mode of the wearable computing device based on at least the input signal;
identifying, from a plurality of first thresholds corresponding to a plurality of tension modes, the first threshold that corresponds to the tension mode; and
identifying, from a plurality of second thresholds corresponding to the plurality of tension modes, the second threshold that corresponds to the tension mode.

10. The method of claim 9, further comprising:
receiving an additional input signal from an input interface component of the wearable computing device that is indicative of a selected tension mode of the wearable computing device, wherein the tension mode is the selected tension mode.

11. The method of claim 1, wherein the first component is configured to determine the movement of the wearable computing device by determining an acceleration of the wearable computing device in at least one dimension.

12. The method of claim 1, wherein the first component includes an image capture device having a field of view that includes an eye, wherein the first component is configured to determine the movement of the wearable computing device by determining a drift in a location of a pupil of the eye from information corresponding to the field of view of the image capture device.

13. The method of claim 1, further comprising: receiving an additional input signal from an additional component of the wearable computing device that includes information indicative of a current tension of the portion of the frame, wherein determining the adjustment of the tension of the portion of the frame includes determining that the adjustment is greater than zero based on (i) determining that the current tension of the portion of the frame is less than a maximum tension; and (ii) determining that the current tension of the portion of the frame is greater than a minimum tension.

14. A non-transitory computer readable memory having stored therein instructions executable by a computing device to cause the computing device to perform functions comprising:
receiving an input signal from a sensor of a wearable computing device that is indicative of a movement of the wearable computing device;
based on the input signal, determining an adjustment of a tension of a portion of a frame of the wearable computing device, wherein the tension of the portion of the frame is indicative of a tightness of at least the portion of the frame on a head of a user; and
providing an output signal to a component of the wearable computing device that is configured to modify the tension of the portion of the frame, wherein the output signal is indicative of the adjustment.

15. The non-transitory computer readable memory of claim 14, further comprising instructions executable by the computing device to cause the computing device to perform functions comprising:
determining an increase in the tension of the portion of the frame based on determining that the movement of the wearable computing device in at least one dimension is greater than a first threshold value, wherein the adjustment includes the increase in the tension of the portion of the frame; and
determining a decrease in the tension of the portion of the frame based on determining that the movement of the wearable computing device in the at least one dimension is less than a second threshold value, wherein the adjustment includes the decrease in the tension of the portion of the frame.

16. A wearable computing device comprising:
a frame;
a first component configured to determine a movement of the wearable computing device;
a second component configured to modify a tension of a portion of the frame; and
a processor configured to (i) receive an input signal from the first component that is indicative of the movement of the wearable computing device; (ii) based on the input signal, determine an adjustment of the tension of the portion of the frame, wherein the tension of the portion of the frame is indicative of a tightness of at least the portion of the frame on a head of a user; and (iii) provide an output signal to the second component, wherein the output signal is indicative of the adjustment.

17. The wearable computing device of claim 16, wherein the portion of the frame comprises a piezoelectric material configured to cause the portion of the frame to flex in a presence of an electric field, wherein the tension of the portion of the frame is based on an amount of flex of the portion of the frame, and wherein the second component is further configured to apply the electric field to the piezoelectric material in response to receiving the output signal.

18. The wearable computing device of claim 16, wherein the portion of the frame comprises a band containing a magnetorheological fluid configured to cause the band to contract in a presence of a magnetic field, wherein the tension of the portion of the frame is based on an amount of contraction of the band, and wherein the second component is further configured to apply the magnetic field to the band in response to receiving the output signal.

19. The wearable computing device of claim 16, wherein the portion of the frame comprises a band containing one a shape memory alloy configured to cause the band to contract in a presence of an electric field, wherein the tension of the portion of the frame is based on an amount of contraction of the band, and wherein the second component is further configured to apply the electric field to the band in response to receiving the output signal.

20. The wearable computing device of claim 16, wherein the wearable computing device is in an eyeglasses configuration.

* * * * *